United States Patent [19]

McIntosh

[11] 4,265,532

[45] May 5, 1981

[54] PHOTO PRINTING BY INTENSITY AND VELOCITY MODULATION

[75] Inventor: Walter L. McIntosh, Woodbridge, Va.

[73] Assignee: LogEtronics Inc., Springfield, Va.

[21] Appl. No.: 50,901

[22] Filed: Jun. 21, 1979

[51] Int. Cl.³ .............................................. G03B 27/80
[52] U.S. Cl. ....................................... 355/20; 355/68; 355/83
[58] Field of Search ....................... 355/20, 80, 81, 83, 355/68, 38

[56] References Cited

U.S. PATENT DOCUMENTS

| | | | |
|---|---|---|---|
| 2,842,025 | 7/1958 | Craig | 355/77 |
| 3,011,395 | 12/1961 | Foise | 355/20 X |
| 3,041,932 | 7/1962 | Kilminster | 355/20 |
| 3,400,632 | 9/1968 | Wahli | 355/20 |

Primary Examiner—L. T. Hix
Assistant Examiner—W. J. Brady
Attorney, Agent, or Firm—K. L. King

[57] ABSTRACT

Automatic incremental control of the exposure of a photosensitive image-receiving material during contact or projection printing is achieved by the use of a scanning exposing light beam, such as that from a cathode ray tube, wherein both the beam intensity and its rate of deflection can be varied in response to signals derived from a photodetector which views the scanning light after its passage through each incremental area of the transparency being reproduced.

Embodiments capable of combined control of the intensity and velocity, or the dwell time, of the scanning light beam are disclosed, together with means for controlling exposure level and contrast.

42 Claims, 6 Drawing Figures

PHOTO PRINTING BY INTENSITY AND VELOCITY MODULATION

BACKGROUND OF THE INVENTION

This invention is an improvement in photographic printers used to make film or paper prints from film transparencies. The object of normal photographic printing is to duplicate, as nearly as possible, the subject matter contained in the original. However, there are also photographic applications in which a perfect duplicate is not desirable. Many scientific, military and topographic reproduction systems require a capability to modify the reproduction means in order to convey all of the information available in the original to the reproduction material. Normal contrast and tonality can not always be preserved since, for example, the light transmission range from the darkest to lightest points in an original photograph may be as great as 100 to 1 or more, while a conventional photographic paper can only reproduce a light reflection ratio of, perhaps, 20 to 1.

The present invention relates to a class of photographic printers which use cathode ray tube (CRT) printing light sources. Such printers alter the gross contrast ratio of the print to enable reproduction of all of the information contained in the camera negative. The gross (ie, large area compared to the size of the scanning spot) contrast ratio existing in the negative is altered electronically to preserve all of the detail and edge contrast gradations. This type of photographic print may have an appearance of "flatness" or unreality but does, in fact, include all of the information present in the camera original.

There are two basic types of CRT printers in the prior art: those that modulate the intensity of light generated by the CRT beam, and those which modulate the velocity of the scanning electron beam in the CRT.

Intensity modulated CRT printers alter the gross contrast of the print by maintaining the light transmitted through the transparency within a given, predetermined brightness range, which may be from 2 to 1 to 20 to 1. Frequently, such printers also include means to selectively alter the contrast ratio within preselected limits. In intensity modulated systems it is important that the velocity or rate of deflection of the scanning beam should remain essentially constant, since the resulting photographic exposure of any incremental area is equal to the product of intensity and time.

In velocity modulated printers, however, it has been customary to maintain the beam intensity constant since the scanning velocity is varied for contrast correction purposes.

Since most CRT printers are used in exacting scientific or military environments, substantial control precision is required. Hence, each separate "family" of such printers has sought to stabilize, as much as possible, at least one component of exposure, be it the scan velocity for intensity modulated (IM) systems or the beam intensity for velocity modulated (VM) systems.

Velocity modulated systems generally achieve adequate compression of the tonal range, but are not well suited to the provision of a preselected contrast control function.

The present invention relates to a new and improved printer that combines both intensity and velocity modulation methods. It provides an apparatus for producing uniform exposures during contact or projection printing.

PRIOR ART STATEMENT

Velocity modulated systems are well known in the Prior Art. An example of this type of printer is illustrated in U.S. Pat. No. 3,036,497 issued to K. Folse, in 1962, for a "Photographic Dodging Apparatus" and assigned to the assignee of the instant application.

Velocity modulation as disclosed by Folse follows the relationship $E=K(Tn/Vs)$ where:

E represents the photographic exposure produced in the photosensitive image receiving material;

Tn represents the local light transmission through the transparency to be reproduced;

Vs represents the local velocity of the scanning spot at the exposing plane; and K is a constant of proportionality which includes, inter alia, the light intensity of the projected spot at the exposing plane, and the number of passes of the spot over the same point in the transparency.

Folse suggests that a velocity modulated printer must always exhibit shorter exposure times than a comparable printer employing intensity modulation because the VM printer operates with its CRT beam current continuously at maximum whereas, in comparison, a DC-coupled intensity modulated printer has its highest CRT beam current only at the point of maximum transparency density. However, Folse fails to note that the peak beam current for IM may be as much as four or more times as great as the maximum permissible current for a comparable VM printer. It follows, of course, that at maximum density the exposure time of an IM printer must be shorter than that of the VM equivalent. Clearly, if an IM printer can operate with a maximum beam current of, say, 1000 microamperes and a scanning rate of, for example, 1000 inches/second, then a VM printer should be able to do likewise.

Unfortunately, the practical restraints resulting from phosphor persistence, using an actinically efficient CRT screen such as P 11, limit the maximum scan rate to about 5000 to 6000 inches per second, and even those rates can produce objectionable border or edge enhancement effects in the photographic reproductions. If the maximum scan rate of a VM printer is 6000 inches per second and dodging (ie, contrast reduction) is required over a 100:1 contrast range, then the minimum scan rate must be about 60 inches per second. Experience has shown that a beam current of 1000 microamperes at a scan velocity of 60 inches per second will at least result in phosphor browning and, at worst, cause the phosphor to burn and flake off the screen, depending upon the CRT spot size (ie, the beam current density).

Intensity modulated systems are also well known in the art. An example of this type of printer is disclosed in U.S. Pat. No. 2,842,025 issued to D. R. Craig, in 1958, for a "Photographic Method", and also assigned to the assignee of the present invention.

As illustrated in the Craig reference, the light passing through the negative and the print is collected by a "light collector 36" and the resulting photodetector current is amplified and applied to a grid 14 of the CRT to produce " . . . negative feed-back effect by which the intensity of light sensed by the photomultiplier tube will tend to remain constant."

It is to be understood that there are many patents which illustrate IM systems, as well as many patents which illustrate VM systems, and that these include some 17 related patents assigned to the assignee of the present invention.

Furthermore, when U.S. Pat. No. 3,700,329 was granted to R. Mason, in 1972, for a "Radiographic Reduction System", which patent is also assigned to the assignee of the present invention, the output of the improved masking circuit was identified as "to deflection ckt. (velocity modulation) *or* to electron gun (intensity modulation)". Emphasis added.

Applicant is aware of only one patent which combines both IM and VM in a single system. To applicants knowledge, no such device has ever been proven workable, or reduced to practice, until applicants invention disclosed in the instant application.

U.S. Pat. No. 3,400,632 issued to R. Wahli, in 1968, for "Method of Photographic Reproduction and Apparatus Therefor" discloses inferentially, at best, the combination of IM and VM in a single system. The only clear teaching, however, comes as a part of the claims, and not directly in the disclosure. For example, FIG. 10 is identified as " . . . modified to provide velocity modulation . . . " and, from Col. 11, line 21 through Col. 12, line 55 there are developed the equations necessary to show the equivalence of velocity modulation masking and intensity modulation masking " . . . within the region of validity of the reciprocity law." In Col. 11, line 24, Wahli also indicates that scanning time may be shortened by velocity modulating the scanning beam. Claim 3 is directed to a VM method in which CRT beam current is held constant, while claim 21, lines 24–35 refers to a part of a photographic reproduction apparatus having means for combined control of the velocity and intensity of the scanning beam.

It is evident from a careful reading of Wahli that this inventor envisaged a system to improve the rendition of a photographic print by altering its density distribution. His object was to provide a print with a pleasing or enhanced appearance. From the specific values and equations used in the patent, it is apparent that a working device had not been constructed as of the time the patent application was filed. From a functional point of view, the Wahli apparatus requires two photosensors and two or more logarithmic amplifiers. Signals proportional to the density of each image point scanned are derived, and a function generator with a tone correction program is provided.

As will be described hereinafter, the IM/VM system which is the subject of the instant invention requires only one photosensor, and no logarithmic amplifiers. Additionally, the system operates on the basis of optical transmission, rather than optical density.

The Wahli reference is applicable only to a VM system, whereas the instant invention is also applicable to a modulated dwell-time printer. U.S. Pat. No. 3,011,395 to K. Folse, in 1961, for a "Photographic Method", also assigned to the assignee of the instant application, describes a dwell-time modulated system wherein the electron beam spot is advanced incrementally, spot by spot, with the dwell time at each spot varying to compensate for density differences in the negative. Applicants present invention successfully combines beam intensity modulation with dwell time modulation.

SUMMARY OF THE INVENTION

It is one object of this invention to make possible the more efficient use of a CRT as an exposing light source.

It is a further object to increase the flexibility with which a CRT or other spot-type scanning light source may be used in a photographic printer.

It is yet another object of this invention to disclose CRT exposing systems of significantly greater speed than those used heretofore.

It is an object of this invention to disclose a CRT exposing system which combines dwell time modulation (DTM) with intensity modulation to provide an improved CRT printer.

It is a further object of the present invention to provide improved gross exposure level control and fine exposure level control with the aforesaid systems.

It is an additional object of the invention to provide an improved contrast control circuit which allows a prescribed contrast ratio in combination with the above systems.

These and other objectives are achieved by combining velocity or dwell time modulation with intensity modulation of the light beam so as to ameliorate the aforementioned limitations.

The methods and apparatus disclosed herein are capable of providing maximum automatic dodging, using a combination of intensity modulation and velocity modulation. In addition, less than maximum dodging can be obtained in a variety of ways. In order that the invention may be clearly understood, a detailed description of the preferred embodiments is provided, with reference to the accompanying drawings.

DESCRIPTION OF THE PREFERRED EMBODIMENTS

Figure 1:
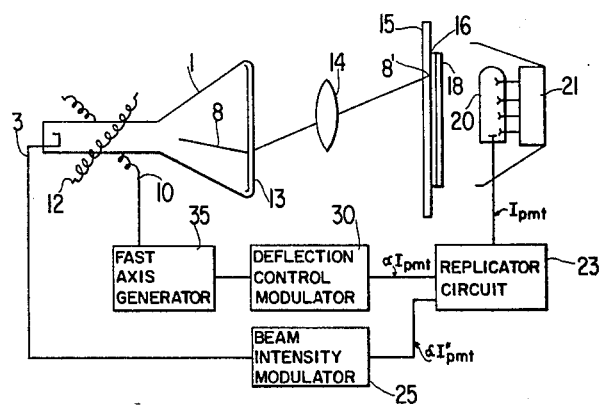
FIG. 1 is a block diagram representation showing the interrelationship of the velocity and beam intensity modulating circuits of the present invention, in a contact printer.

It is well known in the art that the automatic control of print contrast by means of electronic dodging using a CRT is, at best, optimized for that one of a group of characteristics which is considered to be of greatest importance in the specific application of the apparatus. In general, the performance of any CRT light source is bounded by parameters such as phosphor persistence and actinic efficiency, faceplate contrast, phosphor fatigue and burning, phosphor granularity, spot size irregularity, and related operational effects. Furthermore, the employment of CRT's as exposing light sources has necessitated the use of lenses as light collimators and collectors, and has thereby generated a particular class of problems associated with central light projection systems. In addition, the use of lenses creates auxiliary problems of cost, size, and the like.

One example of a limiting characteristic involves the phosphor used for CRT screens. The actinic efficiency of P11-type phosphors is about the highest among the many registered types available; however, a typical P11 phosphor decay period is about 35 microseconds to 10%, and 250 microseconds to 1%, of its peak brightness, depending upon the beam current density employed. For optimum dodging results, a scan rate not exceeding one spot diameter in one persistence period is desirable. Craig, in U.S. Pat. No. 2,921,512 assigned to the assignee of the instant application, suggests a spot diameter of ⅛" as a practical size. Thus, a maximum scan rate between 500"/sec. (for the 1% persistence level) and 3600"/sec. (for the 10% persistence level) is indicated. In an electronic dodging CRT system the controllable range of contrast change is typically 100:1. Therefore, in a VM system based on the maximum rates defined above, the minimum deflection rate would be between 5"/sec. and 36"/sec., at the 1% and 10% persistence levels, respectively. At a CRT beam current capable of producing commercially acceptable printing times, e.g. 200 microamperes, a scan rate between 5"/sec. and 36"/sec. can result in phosphor fatigue and degradation within a matter of minutes.

The foregoing examples illustrate that, within the constraints of practical photographic printing exposure times in production-oriented photographic laboratories, i.e. ten seconds or less, suitable CRT phosphors are bounded by persistence problems at high scan rates, phosphor fatigue and burnout at low scan rates, and actinic insufficiency at reduced beam current.

The present invention does more than combine the circuits and teachings of the Prior Art. It provides performance levels, particularly as regards exposure time, which surpass either intensity modulated or velocity modulated systems, taken individually. This is of critical importance in production-oriented photographic laboratories since it allows higher throughput with present printing parameters, or the ability to trade-off the exposure time savings against a choice of other design parameters in the system. In the preferred case, for maximum exposing speed consistent with minimum phosphor persistence effects, the intensity modulation circuit 25 controls the CRT cathode current over a 4:1 range while the PMT 20 produces a current $I_{pmt}$ dropping from 25 microamperes to 12.5 microamperes. The product of these changes is an 8:1 ratio, equivalent to a density change of 0.9.

Table I, below, compares theoretical variations of PMT current ($I_{pmt}$), CRT cathode current ($I_k$), and scan velocity, to changes in transparency density, for the case where phosphor brightness varies linearly with CRT beam current.

TABLE I

| DENSITY | $I_{PMT}(\mu A)$ | $I_K(\mu A)$ | VELOCITY (INCH/SEC) | |
|---|---|---|---|---|
| 0 | 50 | 200 | 3000 | |
| .1 | 39.7 | 200 | 2383 | VM |
| .2 | 31.5 | 200 | 1893 | |
| .3 | 25 | 200 | 1500 | |
| .4 | 24.5 | 250 | 1470 | |
| .5 | 23.5 | 300 | 1380 | |
| .6 | 22.3 | 355 | 1335 | |
| .7 | 20.8 | 420 | 1248 | |
| .8 | 19.3 | 487 | 1158 | IM/VM |
| .9 | 17.7 | 575 | 1062 | |
| 1.0 | 16 | 642 | 960 | |
| 1.1 | 14.3 | 720 | 858 | |
| 1.2 | 12.5 | 800 | 750 | |
| 1.3 | 10 | 800 | 600 | |
| 1.4 | 7.9 | 800 | 474 | |
| 1.5 | 6.3 | 800 | 378 | |
| 1.6 | 5.0 | 800 | 300 | |
| 1.7 | 3.9 | 800 | 238 | VM |
| 1.8 | 3.1 | 800 | 189 | |
| 1.9 | 2.5 | 800 | 150 | |
| 2.0 | 2.0 | 800 | 120 | |

Table II illustrates theoretical transparency density and PMT current variations versus scan velocity (at a constant CRT current, $I_k$) in a typical VM system.

TABLE II

DENSITY AND PMT CURRENT VARIATIONS vs SCAN VELOCITY

| DENSITY | $I_{PMT}(\mu A)$ | VELOCITY (INCH/SEC) |
|---|---|---|
| 0 | 50 | 3000 |
| .1 | 39.7 | 2383 |
| .2 | 31.5 | 1893 |
| .3 | 25 | 1500 |
| .4 | 20 | 1200 |
| .5 | 15.8 | 949 |
| .6 | 12.5 | 750 |
| .7 | 10 | 600 |
| .8 | 7.9 | 474 |
| .9 | 6.3 | 378 |
| 1.0 | 5 | 300 |
| 1.1 | 3.97 | 238 |
| 1.2 | 3.15 | 189 |
| 1.3 | 2.5 | 150 |
| 1.4 | 2.0 | 120 |
| 1.5 | 1.58 | 95 |
| 1.6 | 1.25 | 75 |
| 1.7 | 1.0 | 60 |
| 1.8 | .79 | 47 |
| 1.9 | .63 | 38 |
| 2.0 | .5 | 30 |

Table III illustrates theoretical transparency density variations versus CRT current $I_k$, (at a constant scan velocity) in a typical DC-coupled IM system.

TABLE III

DENSITY VARIATIONS vs CRT CATHODE CURRENT

| DENSITY | $I_K(\mu A)$ |
|---|---|
| 0 | 8 |
| .1 | 10 |
| .2 | 12.7 |
| .3 | 16 |
| .4 | 20 |
| .5 | 25 |
| .6 | 32 |
| .7 | 40 |
| .8 | 50 |
| .9 | 63.5 |
| 1.0 | 80 |
| 1.1 | 100 |
| 1.2 | 127 |

TABLE III-continued

DENSITY VARIATIONS vs CRT CATHODE CURRENT

| DENSITY | $I_K(\mu A)$ |
|---|---|
| 1.3 | 160 |
| 1.4 | 200 |
| 1.5 | 250 |
| 1.6 | 320 |
| 1.7 | 400 |
| 1.8 | 500 |
| 1.9 | 635 |
| 2.0 | 800 |

Table IV compares the theoretical exposure times of the three exposing systems on the basis of reproducing a transparent step tablet to matching densities, and illustrates a 4:1 printing speed advantage for a combined IM/VM system over an IM-only system, and a 3.6:1 speed advantage over a VM-only system. Also apparent from Table IV is the fact that IM exposes more rapidly than VM for high transparency densities, that VM exposes more rapidly than IM for low transparency densities, and that the IM/VM combination can never be slower than either system taken individually and, in the typical case, is faster.

TABLE IV

EXPOSURE TIME COMPARISON OF D-C COUPLED INTENSITY MODULATION; VELOCITY MODULATION; AND COMBINED INTENSITY AND VELOCITY MODULATION OVER A STEP TABLET HAVING SEVEN EQUAL AREA SEGMENTS.

| DENSITY | IM ONLY | VM ONLY | IM/VM |
|---|---|---|---|
| 0.1 | 2.5 SEC | 0.125 SEC | 0.125 SEC |
| 0.4 | 2.5 | 0.25 | 0.204 |
| 0.7 | 2.5 | 0.5 | 0.24 |
| 1.0 | 2.5 | 1.0 | 0.312 |
| 1.3 | 2.5 | 2.0 | 0.5 |
| 1.6 | 2.5 | 4.0 | 1.0 |
| 1.9 | 2.5 | 8.0 | 2.0 |
| TOTAL TIME | 17.5 SEC | 15.87 SEC | 4.38 SEC |

CONDITIONS: 420 SEQUENTIAL SCAN LINES, EACH 5" LONG AND WITH AN 0.012" LINE ADVANCE TO FORM A 5" × 5" CRT RASTER

Referring to FIG. 1, the present invention employs a CRT 1 to expose a photosensitive image receiving media 18 such as photographic paper or film. The exposure is made through a photographic image carrying media 16 such as a photographic negative. While the preferred embodiment will be described in photographic terms, the invention is not limited to photographic media, but could find application in any exposing device using a laser or other energy beam wherein it is possible to vary both the intensity and the deflection rate of the energy beam.

The exposure in the preferred embodiment is made via a ⅛" diameter beamed spot on raster 13 which is focussed by optical lens means 14 on transparent stage plate 15. Stage plate 15 provides a means for supporting the image carrying media 16 and the image receiving media 18 in registration, for printing. The CRT 1 provides means for exposing the image receiving media 18, by scanning the media with a beamed spot of light, represented as 8' in FIG. 1. A photosensor means is provided, in the form of photomultiplier tube 20, to measure the light passing through the image receiving media 18 and generate an output current $I_{pmt}$ that is responsive to the light.

Figure 2:
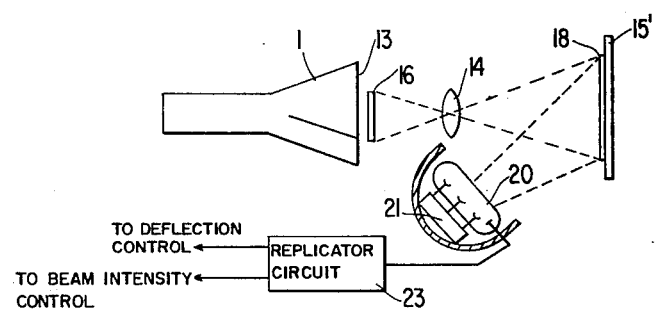
FIG. 2 is a block diagram representation of the present invention, as applied to a projection printer.

An alternate embodiment of the invention is illustrated in FIG. 2 wherein the photosensor means 20 senses the light passing through the image carrying media 16 and reflected from the image receiving media 18. In all other respects, the operation of the system illustrated in FIG. 2 is identical to that of the system of FIG. 1.

The system illustrated in FIG. 1 is a contact printing system wherein the negative and print are maintained in intimate contact, whereas the system illustrated in FIG. 2 is a projection printer wherein the image on negative 16 is projected and focussed by optical lens means 14 on printing paper 18, which is held in registration by support means 15' in a conventional manner. Although FIG. 2 illustrates a reflected light system for photosensor 20, it would also be possible to use a transparent stage plate 15' and mount the photosensor behind the print material 18, or to use a beam splitter adjacent said optical means 14 to split-off a portion of the beam for measurement purposes.

The present invention includes a replicator means 23 which provides circuitry to produce predictably related first ($\alpha I^*_{pmt}$) and second ($\alpha I_{pmt}$) output currents in response to the output current signal $I_{pmt}$ received from photosensor means 20. Two different replicator circuits are disclosed in the present application, and the one illustrated in FIGS. 3 and 4 will be described hereinafter. A modulator means 25 provides beam intensity modulation in response to the first predictably related current ($\alpha I^*_{pmt}$) received from said replicator means 23, by altering the bias on cathode 3 of CRT 1.

A deflection control means 30 is provided to modulate the velocity or dwell period of electron beam 8 in response to variation in the second predictably related current ($\alpha I_{pmt}$) received from replicator means 23.

The means to provide velocity modulation of beam 8 is hereinafter described in detail with respect to FIGS. 3 and 4, whereas the means to provide dwell time modulation is hereinafter described in detail with respect to FIG. 5.

In the present invention, both the beamed spot intensity and the spot velocity or dwell-time are varied in response to the radiant energy received by photosensor means 20.

The specific circuitry used in the replicator means and the modulator means will now be described in detail with respect to FIG. 3.

Figure 3:
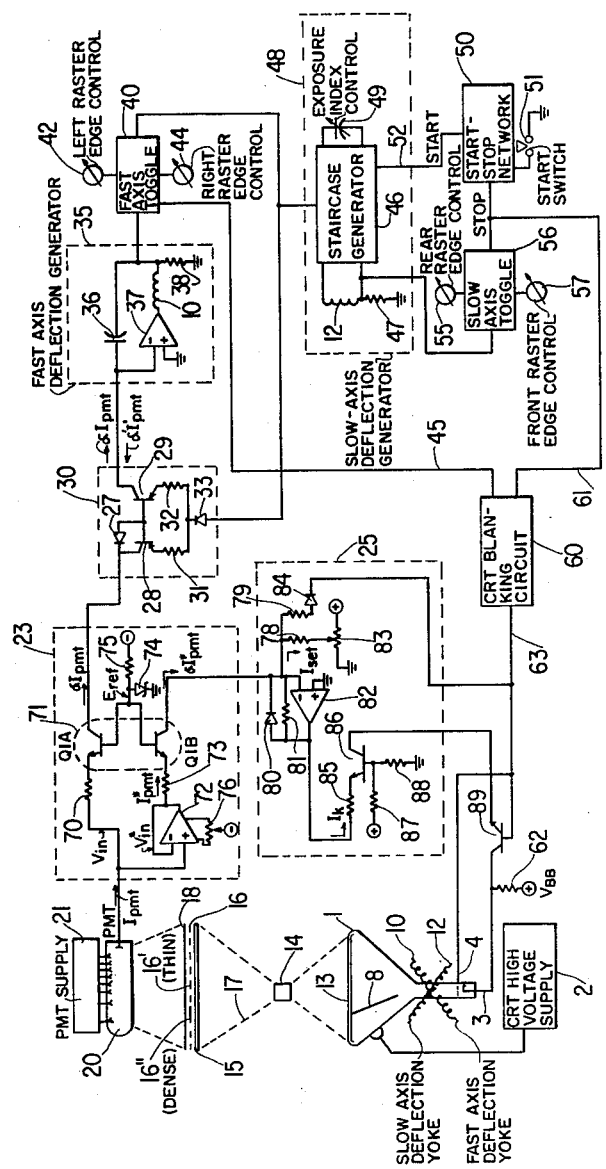
FIG. 3 is a partial schematic and block diagram showing particular velocity modulating and intensity modulating elements.

In FIG. 3, 1 is a CRT, 2 is a CRT high voltage supply, 3 is the CRT cathode, and 4 is the CRT control grid. Together, these elements function to produce an electron beam 8 which is magnetically deflected by the fast axis yoke 10 and the slow axis yoke 12, thereby generating a luminous raster 13 on the CRT faceplate. Light beam 17 is projected by lens 14 to a transparent stage plate 15 bearing a photographic negative or positive transparency 16 over which is superimposed, in intimate contact, the photosensitive image receiving material 18, which can not be opaque in the configuration shown. A photodetector 20, usually in the form of a photomultiplier tube (PMT) having a high voltage power supply 21, responds to light which passes through the photosensitive material 18, and produces a current $I_{pmt}$ which is injected into current replicator circuit 23. The PMT current passes through resistor 70 (one of a pair of matched resistors 70, 73) and into Q1A, one of a matched pair of transistors Q1A, Q1B on a common substrate 71. The base of Q1A is maintained at a negative voltage $E_{ref}$ derived from zener diode 74 and resistor 75. The output of Q1A, where a typical value of $\alpha$ is between 0.990 and 0.998, is $\alpha I_{pmt}$. Unloading amplifier 72 senses voltage $V_{in}$ comprised of ($I_{pmt} \times$ value of resistor 70 (ohms))$+V_{eb}$ (Q1A)$+E_{ref}$, and reproduces it as $V^*_{in}$ where $V^*_{in}$ is typically equal to $V_{in}$ within 0.01%. Amplifier 72 is required to have very low bias or offset current and to be adjustable, by potentiometer 76, to have essentially no offset voltage. For this embodiment in particular, the input currents at maximum operating temperature are not permitted to be in excess of 50 nanoamperes. The signal $V^*_{in}$ is applied, across resistor 73 and the emitter-base of Q1B, to $E_{ref}$. Since Q1B and Q1A can be matched within 0.5 mV in commercially available devices, and resistors 70 and 73 are matched within 1%, $V^*_{in}$ produces a current $I^*_{pmt}$ which is essentially equal to $I_{pmt}$. The collector current output from Q1B then becomes $\alpha I^*_{pmt}$ and typically compares with $\alpha I_{pmt}$ within 1%. Although here indicated as being matched, it is required only that $\alpha I_{pmt}$ and $\alpha I^*_{pmt}$ be predictably related one to the other generally linearly, although non-linear or discontinuous relationships also fall within the scope of this invention. The current $\alpha I_{pmt}$ is a unidirectional current which is used as the input to the fast axis deflection generator 35, comprised of integrating capacitor 36, fast axis deflection yoke 10, operational amplifier 37, and yoke current sampling resistor 38.

The amplitude of $\alpha I_{pmt}$ causes a desired rate-of-change of current amplitude in deflection yoke 10, while current sampling resistor 38 produces a voltage equal to the current amplitude (irrespective of rate-of-change). The fast axis toggle 40 senses the voltage developed across resistor 38, as limited by the left and right raster edge controls 42, 44, and changes its output state from $+V_{max}$ to $-V_{max}$, or vice versa. When the output of toggle 40 is $+V_{max}$, the current inverter 30 operates as a current mirror of a known type (see, for example, RCA application note ICAN-6668, September 1974) and produces a current $\alpha' I'_{pmt}$, by virtue of diode 33 being forward biased and transistors 28, 29 and resistors 31, 32 being matched.

Conversely, when fast axis toggle 40 has its output at $-V_{max}$ then diode 33 is reverse biased and transistors 28, 29 are gated off. The output current $\alpha I_{pmt}$ from current replicator 23 forces a forward bias on diode 27 and a forward bias on the base-collector of transistor 29. Thus, depending upon the state of output toggle 40, the inverter 30 produces a positive or negative electron flow, and integrator 35 integrates accordingly.

The sequence of circuit events in the velocity modulation aspect of the printer is that as light from raster 13 impinges on image-carrying transparency 16 at some low density point 16', PMT 20 produces a large value of output current $I_{pmt}$ which is replicated in circuit 23 as a high value of $\alpha I_{pmt}$ and is manipulated in inverter 30 to produce a high value of either $\alpha I_{pmt}$ or $\alpha' I'_{pmt}$ into fast axis integrator 35, causing a large rate of change of current in yoke 10 so that electron beam 8 is deflected at a high velocity. Conversely, when the beam of light from raster 13 impinges upon a high density area 16'', PMT 20 produces a low value of $I_{pmt}$ and this results in a low rate of change of current in yoke 10, so that electron beam 8 is deflected at a low velocity. In addition to its other functions, fast-axis toggle 40 has an output line 45 to the CRT blanking circuit 60. This output blanks off CRT beam 8, at the left and right turn-around points defined by raster edge controls 42, 44, via line 63. In so doing, the life of the CRT phosphor is prolonged by minimizing the phosphor fatigue which can result from a combination of maximum beam current and low scan velocity.

A gross exposure level control is used to vary the exposure level of the system as required by the emulsion speed of the photosensitive image receiving material 18. This is accomplished by changing the incremental amount of y axis deflection advance between successive x axis scans, to cause overlap of the x axis scans. The degree of overlap then determines the gross exposure level of the system. The exposure index control 49 alters the capacitance of the integrating circuit in the slow axis deflection generator 48. The slow axis deflection generator 48 is used to produce the front-rear deflection of electron beam 8 so as to contribute to the punctiform array of beam positions in raster 13. The action of the slow axis deflection generator 48, in conjunction with its integral parts including staircase generator 46, exposure index control 49, slow axis deflection yoke 12, and current sampling resistor 47, controls the number of scan lines which constitute raster 13, while the start-stop network 50 (initiated by start switch 51) governs the number of integral frames forming the exposure. Taken together, generator 48 and network 50 form a photographic exposure value system which controls the gross exposure level of the photographic reproduction as required by the emulsion speed of photosensitive image receiving material 18. The slow-axis toggle 56, along with rear and front raster edge controls 55, 57 respectively, defines the back-front raster extension, provides a pulse count for start-stop network 50 over line 52, and produces a retrace blanking signal on line 61 for CRT blanking circuit 60. The DC-coupled intensity modulating circuit 25 is controlled by the replicated current $\alpha I^*_{pmt}$ which is compared, in amplifier 82, to a current $I_{set}$. The limit of $I_{set}$ is adjustable by potentiometer 83 via limiting resistor 78 and, for highest printing speed, is selected to be equal to no more than $\alpha I^*_{pmt\ max.}$ and no less than $\alpha(I^*_{pmt\ max.}/5)$. In the preferred embodiment, $I_{pmt\ max.}$ is 50 microamperes and $I_{set}$ is 25 microamperes. Amplifier 82 output is positive by about 0.5 V, and diode 80 is forward biased, when $\alpha I^*_{pmt}$ exceeds $I_{set}$. In the preferred embodiment, the potential divider comprised of resistors 87, 88 sets the base of transistor 86 positive by an amount such that a minimum current $I_k$ exists, having a value of about 200 microamperes. The blanking signal on line 63 is also applied, via isolating diode 84 and limiting resistor 79, to the inverting input terminal of amplifier 82 to clamp its output at a small positive voltage. Thus, when blanking circuit 60 has its output positive, transistor 89 is gated on and conducts $I_k$ to the CRT cathode 3 and cathode bias resistor 62, connected to bias voltage $V_{bb}$.

When $\alpha I^*_{pmt}$ equals $I_{set}$ the output voltage of amplifier 82 reaches zero, and for all values of $\alpha I^*_{pmt}$ less than $I_{set}$ the output of amplifier 82 is negative, thereby increasing $I_k$. The limit of $I_k$ is set by the maximum negative swing of amplifier 82, but the PMT current at which this limit is reached depends upon the value of resistor 81.

Figure 4:
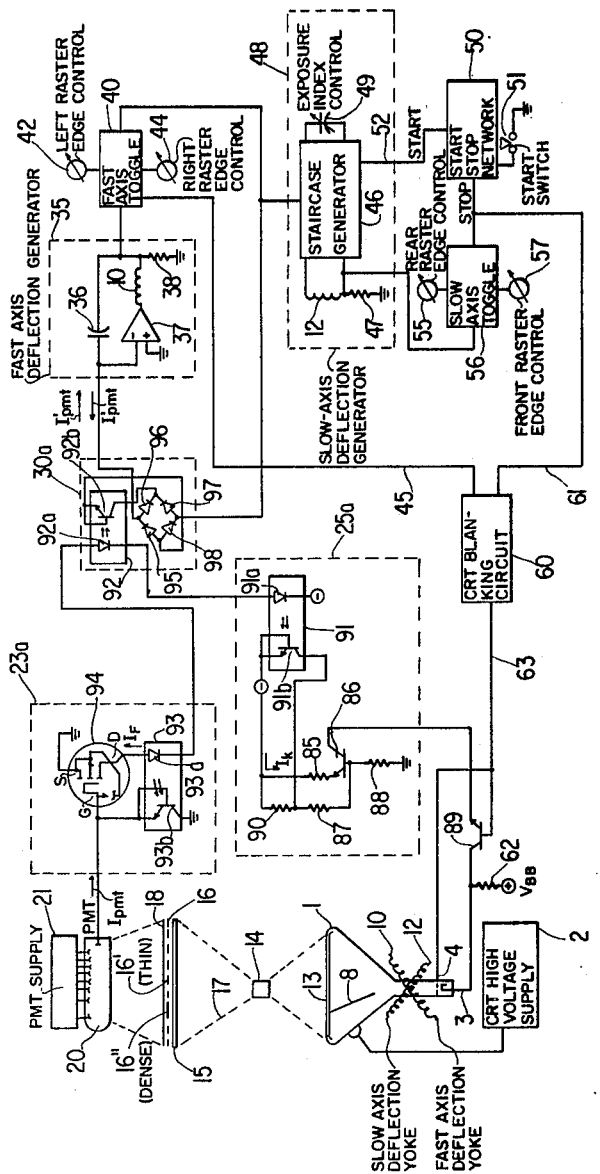
FIG. 4 is an alternate combined form of intensity and velocity modulation, shown in part in a schematic diagram and in part in a block diagram.

FIG. 4 depicts an alternate form of the apparatus to provide simultaneous intensity and velocity modulation, and shows that current replicator 23a, intensity modulating circuit 25a, and current inverter 30a, together, can replace the current replicator 23, intensity modulating circuit 25, and current inverter 30 of FIG. 3.

As a part of current replicator 23a, the p-channel enhancement mode MOS transistor 94 causes a current $I_f$ to flow through photon-coupled isolators 93, 92 and 91. The latter are commonly called opti-couplers. The current $I_f$, in flowing through photon-emitting diode 93a, produces a corresponding (but not generally or necessarily equal) current in photon-sensor 93b, a phototransistor which, in this instance, is operated in a diode mode. Since current $I_f$ from transistor 94 passes through series-connected opti-couplers 93, 92, and 91 then, to the degree that these components are matched, the individual phototransistor sensors 93b, 92b, and 91b will produce equal output currents. Equality is not, however, a requirement. Linear, non-linear, and discontinuously related current production falls within the scope of this invention.

The operation of current replicator 23a is based upon the enhancement mode characteristics and high impedance of MOS-type field effect transistors, such as transistor 94, so that when transistor 94 is off and $I_f$ is therefore zero, photon-sensor 93b is also off and the load impedance seen by PMT 20 becomes high, normally in excess of several hundred megohms. When PMT 20 conducts and generates a current $I_{pmt}$, the gate of transistor 94 of necessity assumes a negative voltage level of a value which produces a drain current $I_f$ which, when photon-coupled from emitter 93a to sensor 93b, generates a shunt current through 93b equal to $I_{pmt}$. The value of $I_f$ is, therefore, related to $I_{pmt}$ in a correct relationship and also properly replicates $I_{pmt}$ in photon-sensors 92b and 91b of opti-couplers 92 and 91 since the drain current $I_f$ flows through the series-connected photon-emitters 93a, 92a and 91a. While FIG. 4 discloses current replication by the use of photon-coupled isolators, it falls within the scope of this invention to include any method whereby a signal from photosensor 20 can be linearly, non-linearly or discontinuously reproduced in a predictable manner so as to control both the current and deflection of CRT beam 8.

Inverter 30a operates in conjunction with a rectifying bridge consisting of signal diodes 95, 96, 97 and 98 having low leakage currents and short recovery times. Because of this rectification action, the fast axis toggle 40 has its alternating voltage impressed across photon-sensor 92b as a d-c voltage, with the collector of transistor 92b always positive with respect to its base. Inasmuch as photon-sensor 92b replicates $I_{pmt}$ as $I'_{pmt}$, then the toggle 40 actuates a current $+I'_{pmt}$ or $-I'_{pmt}$ through the inverter 30a, depending only upon the polarity of the fast axis toggle 40 output voltage. Similarly, the intensity modulating circuit 25a generates a current $I^*_{pmt}$ in photon sensor 91b by virtue of transistor 94 drain current $I_f$ passing through opti-coupler 91 and photon-emitter 91a. When $I_{pmt}$ is at a maximum at a point 16' where transparency 16 is of low density, the replicated current $I^*_{pmt}$ is also at a maximum and shunts resistor 90 to the greatest degree. The voltage drop across the network consisting of resistor 90, transistor 91b, and resistor 87 is thereby at its lowest level. Hence, the voltage from base to emitter across transistor 86, and across resistor 85, is also at its lowest. As a consequence, the current $I_k$ through resistor 85, transistor 86, transistor 89, and into cathode 3 of CRT 1 as beam current, is also at a minimum. As $I^*_{pmt}$ diminishes, the voltage drop across resistors 90, 87 and transistor 91b increases, as does $I_k$ and the beam current and brightness of the CRT.

Figure 5:
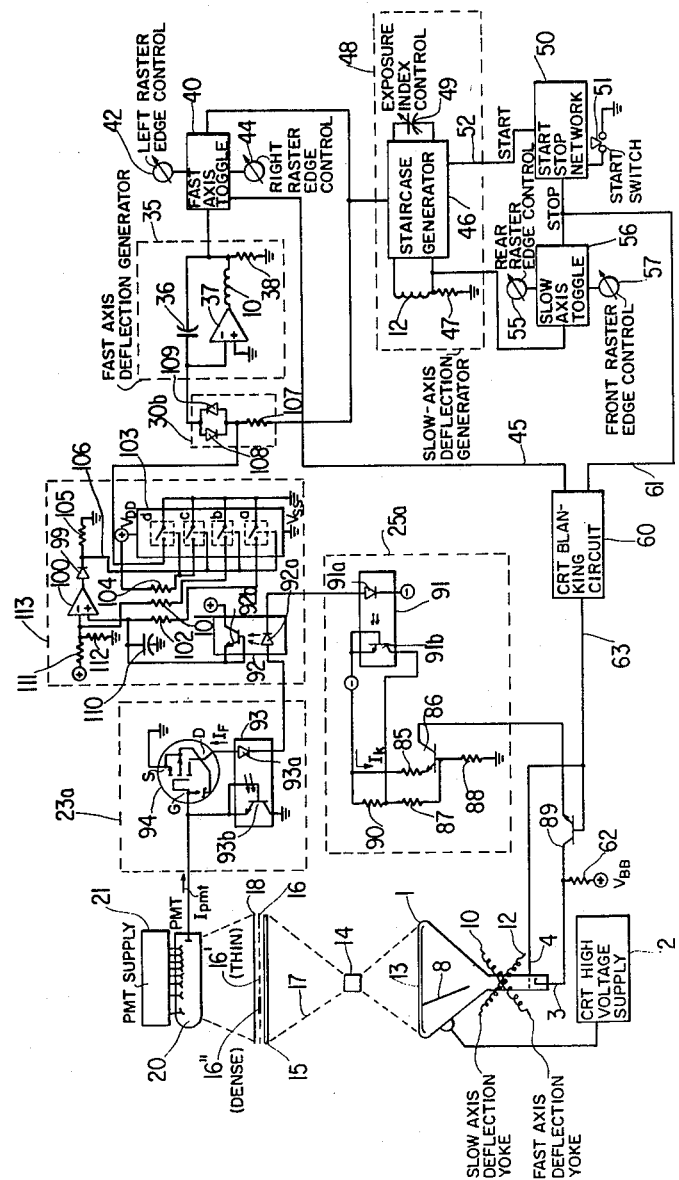
FIG. 5 is a further alternate form of the system of FIG. 4.

FIG. 5 depicts a further variation of the apparatus whereby simultaneous intensity modulation and dwell time modulation of electron beam 8 are provided. U.S. Pat. No. 3,011,395 to Folse, assigned to the assignee of the instant application, discloses dwell time modulation as a method of achieving automatic dodging, and claims the use of a CRT operated at constant intensity and with a constant spot size, employing beam blanking between the dwell periods. Dwell time modulation is a photographic method comprising directing a light beam in a sequential, step-by-step fashion to illuminate each small area of a transparency so that, whether by contact or by projection printing, a photosensitive image receiving emulsion may be exposed through the transparency. Each step period represents a dwell time proportional to the integral of the actinic light passing through the transparency to produce the exposure, and said light is sensed by a photosensitive device such as a PMT. Upon termination of each dwell period, the directed light beam is repositioned to an adjacent, previously unexposed, incremental area where the exposing cycle is repeated, and this step-by-step action continues until such time as all areas of the transparency have been exposed in a controlled, punctiform fashion.

FIGS. 3 and 4 define a photographic printer with beam intensity modulation and spot velocity modulation. FIG. 5 describes a photographic printer using beam intensity modulation and spot dwell time modulation in combination. The apparatus of FIG. 5 specifically controls dwell time, and also varies the CRT beam current. Additional circuits for the control of spot size, and for the provision of beam blanking between the dwell periods, are not shown since they are well known to those skilled in the art. In a typical device using a P11 CRT phosphor, and depending upon the sharpness of beam focus, the maximum practical dwell time is about a millisecond at a beam current of 200 microamperes while, for a printer capable of 100:1 range of image contrast correction, the minimum dwell time is then about 10 microseconds. When simultaneous intensity modulation is added, and if the 200 microamperes and one millisecond beam current×time constraint is retained as a limit, then the maximum dwell time at a higher beam current such as 800 microamperes must be reduced to about 250 microseconds per dwell area if phosphor fatigue or burning is to be avoided.

In FIG. 5, current replicator 23a and intensity modulating circuit 25a remain as shown in FIG. 4. However, opti-coupler 92, with photon-emitter 92a and photon sensor 92b are here shown as parts of a dwell time modulation circuit 113. Specifically, a current flows from photon sensor 92b as a function of a current $I_f$ through photon-emitter 92a in the manner described heretofore. This is now a charging current for integrating capacitor 110, where it generates a voltage $e_c$, defined as the voltage level on capacitor 110. Amplifier 100 senses the voltage level $e_c$ on capacitor 110 and compares it to a voltage $E_r$ derived from a voltage divider network comprised of resistors 111, 112. When $E_r$ is greater than $e_c$, the output voltage of amplifier 100 is negative and its path is interrupted by blocking diode 99. However, when $e_c$ exceeds $E_r$ the output voltage of amplifier 100 swings to a maximum positive level whereby it forward biases diode 99 and is applied to line 106, where the positive voltage is directed to the control terminals of an analog bilateral switch 103 having controlled switch elements 103a, 103b, 103c and 103d. Resistor 105 serves to lower the control line impedance so that random noise will not gate any of the switch elements 103a, 103b or 103c on when diode 99 blocks.

When line 106 swings positive, switch 103a closes and capacitor 110 begins to discharge through resistor 102. Simultaneously, switch 103b closes to ground resistor 101 and place it electrically in parallel with resistor 112. Voltage $E_r$, at the junction of resistors 101, 111 and 112, assumes a new value $E'_r$ which is less than $e_c$; thus, amplifier 100 retains its positive output polarity as capacitor 110 discharges. When voltage $e_c$ falls below $E'_r$ the output voltage of amplifier 100 swings negative, diode 99 blocks, line 106 drops to zero voltage, and switches 103a and 103b open. Voltage $E'_r$ then reverts to $E_r$ and capacitor 110 begins to recharge.

When amplifier 100 has a negative output voltage and line 106 is at zero potential via blocking diode 99, switch 103c is also open. The ungrounded element of switch 103c is therefore at a positive voltage, through resistor 104, and switch 103d is thereby gated to a closed contact condition, grounding resistor 107 at its junction with inverting diodes 108, 109 associated with fast axis deflection generator 35. The current flowing through resistor 107 is of a positive or negative sense depending upon the output polarity of fast axis toggle 40, as previously described. In either condition, said current is conducted to ground, rather than through diode 108 (for a negative current) or diode 109 (for a positive current.) The fast axis deflection amplifier 35 now acts in the well known "hold" mode of a sample and hold integrator.

When amplifier 100 produces a positive output voltage as described heretofore, switch 103c is gated closed and resistor 104 causes the control voltage of switch 103d to drop to near zero so that switch 103d opens and no longer connects resistor 107 to ground. At that time the positive or negative current through resistor 107 must be conducted through diode 108 or diode 109, placing fast axis deflection generator 35 into the "sample" mode. This action occurs at the end of each dwell period and lasts only through the discharge time of capacitor 110. Once capacitor 110 has discharged and amplifier 100 resets to a negative output voltage, switch 103d recloses, and resistor 107 is again shorted to ground, so that fast axis deflection amplifier 35 is again placed in the "hold" mode.

The effect of phosphor persistence is a complicating factor in dwell time modulation, just as it is in the aforementioned IM and VM exposing systems. Theoretically, the CRT could be gated off by means of a blanking circuit for an interval equal to the phosphor decay time after each dwell period with the intent to more accurately expose the various incremental areas of transparency 16 to photosensitive emulsion 18. However, the relative contribution to the overall exposure of emulsion 18 resulting from phosphor persistence (i.e., the phosphorescing component of the luminescent screen emission) would then be uncontrolled, rather than partially controlled as in a system without blanking, so that photographic exposure accuracy would probably be worse, rather than better.

Heretofore in this discussion, certain circuits have been described as they relate to replication of a photosensor current, and without regard to the limiting of upper and lower current levels. The photographic effect of photosensor current replication, using a ⅛" diameter CRT spot, is the production of a luminous unsharp mask capable of reducing gross image contrast to a very low level. As observed by Craig, in U.S. Pat. No. 2,921,512, such reproductions are scientifically informative but pictorially displeasing.

Luminous masking is an art first taught by, among others, the Radio Corporation of America in British Pat. No. 713,285, and by Craig in U.S. Pat. No. 2,842,025 and was mathematically derived by Wahli, in U.S. Pat. No. 3,400,632. However, while the RCA and Craig patents teach electronic dodging by unsharp masking, Wahli teaches the use of sharp masking in tone correction systems. It should be recognized that electronic dodging is essentially a tone-distorting reproduction method.

Figure 6:
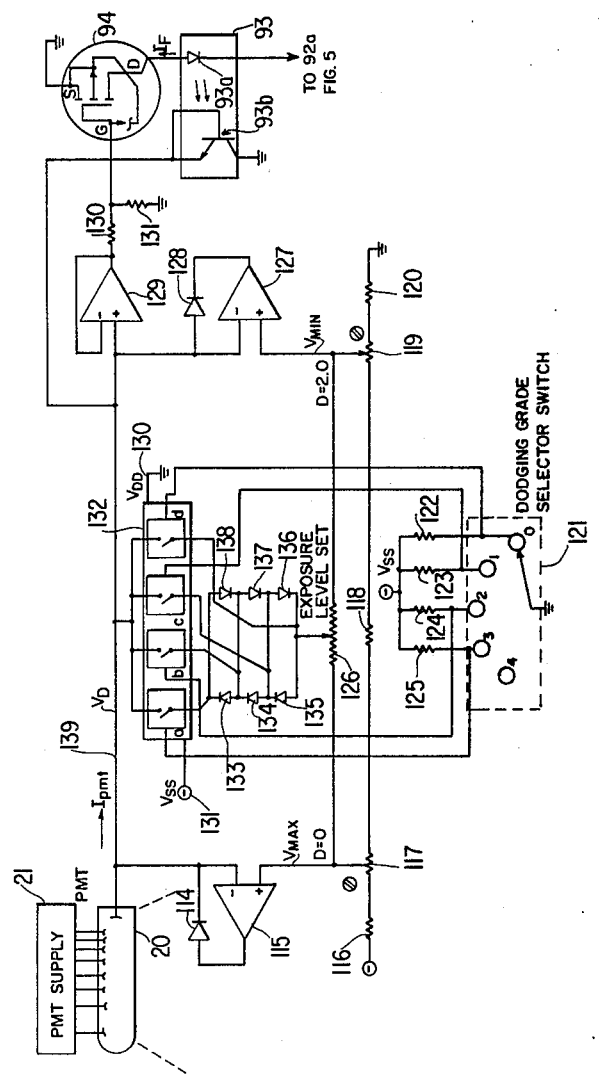
FIG. 6 is a partial schematic and block diagram showing a means of controlling the dodging grade of the circuits of FIGS. 4 and 5.

In order to enable selection of the degree of gross contrast control to be employed during the making of an exposure, it is possible to introduce a dodging grade selector control, as shown in FIG. 6, between the output of the PMT or other photosensor 20 and the input of current replicator 23, represented by MOS transistor 94. When photodetector 20 senses the exposing light after its modulation by density differences in transparency 16, it delivers an output current to line 139 in FIG. 6 which is connected to, among other points, a high input impedance buffer amplifier 129 having a low bias current. The PMT current, $I_{pmt}$, forces amplifier 129 to produce a negative voltage at its output which is divided, for scaling purposes, by resistors 130, 131. The attenuated signal is applied to the gate, G, of transistor 94, thereby producing a drain current $I_F$ which forward biases photon emitter 93a and energizes photon-sensor 93b in such a way that transistor 93b shunts $I_{pmt}$ to ground, as previously discussed.

While transistor 94 can be linear in terms of its gate voltage versus output current, in a preferred form it is selected to provide a square-law response. Since opti-coupler 93 is a linear or near-linear device, the output current of photon-sensor 93b is linear with respect to photon source current $I_F$, and is equal to $I_{pmt}$. Therefore, the voltage on line 139 will, in general, follow the form $$V_D = kV_{GO}(K\sqrt{I_{pmt}} + 1)$$

where:

$V_D$ is the dodging signal voltage on line 139;

$V_{GO}$ is the gate voltage of transistor 94 at its point of current cutoff;

$I_{pmt}$ is the output current from photon-sensor 20 and k and K are scale factors which, inter alia, relate the voltage division of resistors 130, 131 and the current transfer ratio of opti-coupler 93.

In a preferred embodiment of a combined IM/VM or IM/DTM system, $V_D$ is about 8 V at a PMT current of 50 microamperes, and 4.8 V at 2 microamperes, where 50 microamperes corresponds to 0.0 density, and 2 microamperes corresponds to a density of 2.0 in transparency 16. Clamping amplifiers 115 and 127 are used to limit the voltage excursions of $V_D$ on line 139 to those which are definable for the maximum and minimum PMT currents produced by the 0.0 and 2.0 density levels in the photographic transparency being reproduced. Amplifier 115, via its non-inverting input, senses the voltage $V_{max}$ at the wiper of potentiometer 117 and compares it to voltage $V_D$ on line 139. When $V_D$ is less negative than $V_{max}$ the output voltage of amplifier 115 is at a negative maximum, but blocking diode 114 prevents any effect on line 139 and voltage $V_D$. However, if $V_D$ exceeds the negative value of $V_{max}$, then the output voltage of amplifier 115 becomes relatively positive, which forward biases diode 114 sufficiently to shunt off such excess current as would make voltage $V_D$ on line 139 exceed $V_{max}$ on the wiper of potentiometer 117 by more than a few microvolts.

In a similar fashion, amplifier 127 senses $V_D$ on line 139 and compares it to $V_{min}$ from the wiper of potentiometer 119. If $V_D$ is more negative than $V_{min}$, then the output voltage of amplifier 127 is positive and blocking diode 128 prevents any effect of its output from appearing on line 139. Conversely, if the photosensor current drops to a value less than the defined minimum current so that $V_D$ would drop below $V_{min}$ as set on potentiometer 119, then the output voltage of amplifier 127 swings relatively negative and causes blocking diode 128 to be forward biased so as to produce a current on line 139 equal to the defined minimum. While the $V_{max}$ and $V_{min}$ set points on potentiometers 117 and 119, respectively, are useful in setting excursion limits to voltage $V_D$, they also provide end points for exposure level set potentiometer 126, inasmuch as all voltages available at the wiper of potentiometer 126 must fall within the limits set by $V_{max}$ and $V_{min}$.

Potentiometer 126 provides a fine exposure level control related to light transmission through photographic transparency 16, in contradistinction to the gross exposure level control of staircase generator 48 and start-stop network 50, which provide exposure level setting against the relative speed of photographic emulsion 18.

Exposure level set potentiometer 126 is connected to line 139 through an analog bi-lateral switch 132 having switch elements a-d, and through diodes 133-138. The control elements of switch 132 are connected to dodging grade selector switch 121, and also to noise damping resistors 122-125. Thus, for example, the control line for switch element 132d is connected to resistor 122 and switch 121 at dodging grade position 0. In this position of switch 121, the control lead of switch 132d is at ground potential $V_{DD}$, via line 130, and is therefore relatively positive to the $-V_{ss}$ lead 131 of switch 132. Hence, switch 132d is closed and the wiper of potentiometer 126 is connected directly to line 139 and its associated points. As defined here, potentiometer 126 carries a much larger current than $I_{pmt}$, and is correspondingly a relatively lower impedance. In consequence, $V_D$ on line 139 must assume the voltage of the wiper of potentiometer 126 and cannot respond to the photosensor current $I_{pmt}$ from PMT 20. Thus, dodging grade 0 on selector switch 121 results in zero dodging at whatever exposure level is set on potentiometer 126.

At the dodging grade 1 position of switch 121 the control element of switch 132c is raised relatively positive to the $-V_{ss}$ line of switch 132. As a result, switch 132c is closed and connects line 139, via back-to-back diodes 135, 136 to the wiper of the exposure level set potentiometer 126. When $V_D$ on line 139 is within ±0.5 V of the exposure level set potentiometer wiper voltage, diodes 135, 136 are insufficiently biased to conduct. As a result, over this limited range of voltages, line 139 has a voltage $V_D$ produced only by current $I_{pmt}$ and not otherwise influenced. When, however, $V_D$ varies to greater degree, either diode 135 or 136 will begin to conduct, and will thereby limit the dodging effect around a selected exposure level.

Dodging grades 2 and 3, as selected on switch 121, similarly engage switches 132b or 132a and key in other diode pairs 134, 137 or 133, 138. For dodging grade 2 the allowable voltage swing on line 139 is ±1.0 V, while dodging grade 3 allows ±1.5 V. As is further shown in FIG. 6, when switch 121 is in the dodging grade 4 position, analog switch 132 has no control elements gated on with a relatively positive voltage. Thus, there is no connection between potentiometer 126 and line 139, and the available dodging is limited only by the action of amplifiers 115 and 127, in the manner previously described.

The use of diodes, and the number of diodes used, to effect the gross contrast control of the photographic reproduction is merely one form of a preferred embodiment. Other techniques will be obvious to those skilled in the art and all fall within the spirit of this invention.

What is claimed is:

1. A photographic printer to expose an image receiving media from an image carrying media by scanning said image carrying media with a beamed spot of radiant energy, said printer including:
    a. means for supporting said image receiving media and said image carrying media in registration, for printing,
    b. means for exposing said image receiving media by scanning said image carrying media with a beamed spot of radiant energy,
    c. single photosensor means for measuring the radiant energy passing through the image carrying media to generate a density related signal that is predictably related to said radiant energy,
    d. replicator means for producing predictably related first and second output currents in response to the output signal received from said photosensor means,
    e. modulator means responsive to said first output current to modulate the intensity of the beamed spot of radiant energy in response to variations in the first output current,
    f. deflection control means responsive to said second output current to modulate the velocity or dwell period of said beamed spot of radiant energy in response to variations in the second output current, whereby both the beamed spot intensity and the spot velocity or the spot dwell time are varied in response to variations in the level of radiant energy received by said photosensor means.

2. A photographic printer as claimed in claim 1 wherein said replicator means further comprises a pair of matched transistors to generate said first and second output currents.

3. A photographic printer as claimed in claim 1 wherein said replicator means further comprises a set of matched photon-coupled isolators.

4. A photographic printer as claimed in claim 1 wherein said deflection control means to modulate the velocity of the beamed spot of radiant energy further comprises integrator means to modulate the current supplied to a deflection means controlling the motion of said beamed spot.

5. A photographic printer as claimed in claim 1 wherein said deflection control means to modulate the dwell time of the beamed spot of radiant energy further includes:
    a. a fast axis toggle means connected after said deflection control means and a deflection yoke, said yoke surrounding the source of said beam to provide controlled motion thereof, b. means for charging and discharging capacitance means to vary the beamed spot dwell time and spot advance by incrementally clamping and subsequently holding the output from said fast axis toggle means for a dwell period, the duration of said dwell being varied between successive incremental advances by modulating the rate of charging of said capacitance means by said second output current.

6. A photographic printer as claimed in claim 1 which further includes gross exposure level control means, said means including:
   a. x-axis integrator means and y-axis integrator means to modulate the x and y motions of said beam of radiant energy,
   b. exposure index control means to vary the incremental y-axis advance of said beam.

7. A photographic printer as claimed in claim 1 which further includes a fine exposure level control means, said fine level control means being located between said photosensor means and said replicator means, and including:
   a. a pair of clamping amplifier means to limit the voltage excursions derived from the photosensor current,
   b. resistance means for selecting any given voltage level within said excursions to vary the current output provided to said replicator means.

8. A photographic printer as claimed in claim 7 which further includes gross contrast control means, said means comprising:
   a. a plurality of diode pairs connected back-to-back in series, said diodes being arranged between said photosensor and said replicator, and being connected across the voltage excursion source defined by said clamping amplifiers,
   b. switch means for selecting any given number of said series-connected pairs of diodes to selectively limit the current levels supplied to said replicator.

9. A photographic printer as claimed in claim 5 which further includes a fine exposure level control means, said fine control means being located between said photosensor and said replicator and including:
   a. a pair of clamping amplifier means to limit the voltage excursions derived from the photosensor current,
   b. resistance means for selecting any given voltage level within said excursion to vary the current output provided to said replicator means.

10. A photographic printer as claimed in claim 9 which further includes gross contrast control means, said means comprising:
    a. a plurality of diode pairs connected back-to-back in series, said diodes being arranged between said photosensor and said replicator, and being connected across the voltage excursion source defined by said clamping amplifiers,
    b. switch means for selecting any given number of said series-connected pairs of diodes to selectively limit the current levels applied to said replicator.

11. A photographic printer as claimed in claim 1 wherein separate support means are provided for said image carrying media and said image receiving media, said support means being separated with said optical means mounted between said support means to focus the scanning spot passing through said image carrying media onto said image receiving media.

12. A photographic printer using a cathode ray tube (CRT) light source for exposing an image receiving media wherein the CRT beam intensity and velocity of deflection are modulated to vary both the exposure level and the gross contrast of the photographic reproduction, said printer including:
    a. a CRT light source having an electron beam, a light-emitting phosphor screen, and a fast x-axis and slow y-axis deflection control means surrounding said beam, wherein said electron beam generates a scanning spot of radiant energy on said screen,
    b. support means to maintain the image receiving media in intimate contact with the image carrying media,
    c. optical means to focus the scanning spot from the light-emitting screen on the image carrying media,
    d. single photosensor means for measuring the intensity of the light passing through the image carrying media to generate a density related signal that is predictably related to said light,
    e. replicator means for reproducing first and second output currents in response to the signal received from said photosensor means,
    f. modulator means responsive to said first output current to vary the intensity of said electron beam as said first output current from said replicator means varies,
    g. deflection control means responsive to said second output current to vary the scanning spot velocity as said second output current from said replicator means varies,
   whereby both the CRT beam intensity and the spot velocity are varied in response to variations in the light level received by said photosensor means.

13. A photographic printer as claimed in claim 12 wherein said replicator means further comprises a pair of matched resistor means and a pair of matched bipolar transistors.

14. A photographic printer as claimed in claim 12 wherein said replicator means further comprises a set of matched photon-coupled isolators.

15. A photographic printer as claimed in claim 12 wherein said deflection control means further comprises:
    a. fast x-axis toggle means to generate x-axis control signals for a fast x-axis deflection yoke,
    b. integrator means arranged to receive said second output current and further modulate the signal supplied by said fast x-axis toggle to said deflection yoke.

16. A photographic printer as claimed in claim 12 which further includes gross exposure level control means, said means including:
    a. slow y-axis toggle means to generate y-axis control signals for said slow y-axis deflection control means,
    b. variable capacitance means to vary the slow y-axis scan advance of said electron beam to thereby adjust the degree of overlap of successive x-axis scans.

17. A photographic printer as claimed in claim 12 which further includes a fine exposure level control means, said fine level control means being located between said photosensor and said replicator, and including:

a. a pair of clamping amplifier means to limit the voltage excursions derived from the photosensor output signal, b. resistance means for selecting any given voltage level within said excursions to vary the current output provided to said replicator means.

18. A photographic printer as claimed in claim 17 which further includes gross contrast control means, said means comprising:

a. a plurality of diode pairs connected back-to-back in series, said diodes being arranged between said photosensor and said replicator, and being connected across the voltage excursion source defined by said clamping amplifiers, b. switch means for selecting any given number of said series-connected pairs of diodes to selectively limit the current levels supplied to said replicator.

19. A photographic printer using a cathode ray tube (CRT) light source for exposing an image receiving media, wherein the CRT beam intensity and dwell time are modulated to vary both the exposure level and the gross contrast of the photographic reproductions, said printer including:

a. a CRT light source having an electron beam, a light-emitting phosphor screen, and a fast x-axis and slow y-axis deflection yoke surrounding said beam, wherein said electron beam generates a scanning spot of radiant energy on said screen, b. support means to maintain the image receiving media in intimate contact with the image carrying media, c. optical means to focus the scanning spot from the light-emitting screen on the image carrying media, d. photosensor means for measuring the intensity of the light passing through said image carrying media and generating an output signal in response thereto, e. replicator means for reproducing first and second output currents in response to the output signal received from said photosensor means, f. modulator means responsive to said first output current to vary the intensity of said electron beam as said first output current from said replicator means varies, g. deflection control means responsive to said second output current to vary the scanning beam dwell period, said deflection control means including means for charging and discharging a capacitor to vary the beam dwell time and beam advance by incrementally sampling and holding the control signal to said fast x-axis deflection yoke, whereby both the CRT beam intensity and the spot dwell time are varied in response to variations in the light intensity received by said photosensor means.

20. A photographic printer as claimed in claim 19 wherein the charging rate of the capacitor in said deflection control means, and the value of the second output current supplied by said replicator, determine the duration of each incremental dwell period.

21. A photographic printer as claimed in claim 20 which further includes a fine exposure level control means, said fine level control means being located between said photosensor and said replicator, and including:

a. a pair of clamping amplifier means to limit the voltage excursions derived from the photosensor current, b. resistance means for selecting any given voltage level within said excursions to vary the current output provided to said replicator means.

22. A photographic printer as claimed in claim 21 which further includes gross contrast control means, said means comprising:

a. a plurality of diode pairs connected back-to-back in series, said diodes being arranged between said photosensor and said replicator, and being connected across the voltage excursion source defined by said clamping amplifiers, c. switch means for selecting any given number of said series-connected pairs of diodes to selectively limit the current levels supplied to said replicator.

23. A photographic printer using a cathode ray tube (CRT) light source for exposing an image receiving media from an image carrying media wherein both the CRT beam intensity and the CRT beam velocity may be modulated to vary both the exposure level and the gross contrast of the image receiving media, said printer including:

a. a CRT light source having an electron beam, an intensity modulating means for said beam, a light emitting phosphor screen, and a fast axis and slow axis deflection control means surrounding said beam, wherein said electron beam generates a scanning spot of radiant energy on said screen, b. support means to maintain the image receiving media in intimate contact with the image carrying media, c. optical means to focus the scanning spot from the light emitting screen through the image carrying media and on to the image receiving media, d. a single photosensor means for measuring the radiant energy passing through the image carrying media to generate a density related signal that is predictably related to the level of radiant energy after its passage through said image carrying media, e. duplicating means for producing first and second electrical output signals that vary as the intensity of the light passing through the image receiving media varies, each of the signals being predictably related to the other for each excursion in light intensity, f. beam velocity modulating means responsive to said first electrical output signal to vary the scanning spot velocity as said first output signal from said duplicating means varies, g. beam intensity modulating means responsive to said second output signal to vary the intensity of said electron beam as the second electrical signal from said duplicating means varies, whereby both beamed spot intensity and spot velocity may be varied in response to variations in the level of radiant energy received by said photosensor means.

24. A photographic printer as claimed in claim 23 which further includes a fine exposure level control means, said fine control means being located between said photosensor and said replicator and including:

a. a pair of clamping amplifier means to limit the voltage excursions derived from the photosensor current, b. resistance means for selecting any given voltage level within said excursion to vary the current output provided to said replicator means.

25. A photographic printer to expose an image receiving media from an image carrying media by scanning said image carrying media with a beamed spot of radiant energy, said printer including:

a. first and second support means for supporting said image carrying media and said image receiving media in registration, said first means supporting said image carrying media and said second means supporting said image receiving media, said first and second support means being separated by an optical means located between said image carrying media and said image receiving media, b. means for exposing said image receiving media by scanning said image carrying media with a beamed spot of radiant energy, c. single photosensor means for measuring the radiant energy passing through the image carrying media to generate a density related signal that is predictably related to said radiant energy, d. replicator means for producing related first and second output currents in response to the output signal received from said photosensor means, e. modulator means responsive to said first output current to modulate the intensity of the beamed spot of radiant energy in response to variations in the first output current, f. deflection control means responsive to said second output current to modulate the velocity or dwell period of said beamed spot of radiant energy in response to variations in the second output current, whereby both the beamed spot intensity and the spot velocity or the spot dwell time are varied in response to variations in the level of radiant energy received by said photosensor means.

26. A photographic printer as claimed in claim 25 wherein said replicator means further comprises a pair of matched transistors to generate said first and second output currents.

27. A photographic printer as claimed in claim 25 wherein said replicator means further comprises a set of matched photon-coupled isolators.

28. A photographic printer as claimed in claim 25 wherein said deflection control means to modulate the velocity of the beamed spot of radiant energy further comprises integrator means to modulate the current supplied to a deflection means controlling the motion of said beamed spot.

29. A photographic printer as claimed in claim 25 which further includes gross exposure level control means, said means including:

a. x-axis integrator means and y-axis integrator means to modulate the x and y motions of said beam of radiant energy, b. exposure index control means to vary the incremental y-axis advance of said beam.

30. A photographic printer as claimed in claim 25 which further includes a fine exposure level control means, said fine level control means being located between said photosensor means and said replicator means, and including:

a. a pair of clamping amplifier means to limit the voltage excursions derived from the photosensor current, b. resistance means for selecting any given voltage level within said excursions to vary the current output provided to said replicator means.

31. A photographic printer using a cathode ray tube (CRT) light source for exposing an image receiving media wherein the CRT beam intensity and velocity of deflection are modulated to vary both the exposure level and the gross contrast of the photographic reproduction, said printer including:

a. a CRT light source having an electron beam, a light-emitting phosphor screen, and a fast x-axis and slow y-axis deflection control means surrounding said beam, wherein said electron beam generates a scanning spot of radiant energy on said screen, b. first support means for supporting said image carrying media, and second support means for supporting said image receiving media, said support means being separated by an optical means located between said image carrying media and said image receiving media, said optical means focussing the scanning spot from the light-emitting screen on the image receiving media after its passage through the image carrying media, c. single photosensor means for measuring the intensity of the light passing through the image carrying media to generate a density related signal that is predictably related to said light, d. replicator means for reproducing first and second output currents in response to the signal received from said photosensor means, e. modulator means responsive to said first output current to vary the intensity of said electron beam as said first output current from said replicator means varies, f. deflection control means responsive to said second output current to vary the scanning spot velocity as said second output current from said replicator means varies, whereby both the CRT beam intensity and the spot velocity are varied in response to variations in the light level received by said photosensor means.

32. A photographic printer as claimed in claim 31 wherein a single photo sensor is positioned to receive light reflected from said image receiving media after said scanning spot has passed through said image carrying media.

33. A photographic printer as claimed in claim 31 wherein said replicator means further comprises a pair of matched resistor means and a pair of matched bipolar transistors.

34. A photographic printer as claimed in claim 31 wherein said replicator means further comprises a set of matched photon-coupled isolators.

35. A photographic printer as claimed in claim 31 wherein said deflection control means further comprises:

a. fast x-axis toggle means to generate x-axis control signals for a fast x-axis deflection yoke, b. integrator means arranged to receive said second output current and further modulate the signal supplied by said fast x-axis toggle to said deflection yoke.

36. A photographic printer as claimed in claim 31 which further includes gross exposure level control means, said means including:

a. slow y-axis toggle means to generate y-axis control signals for said slow y-axis deflection control means, b. variable capacitance means to vary the slow y-axis scan advance of said electron beam to thereby adjust the degree of overlap of successive x-axis scans.

37. A photographic printer as claimed in claim 31 which further includes a fine exposure level control means, said fine level control means being located between said photosensor and said replicator, and including:
  a. a pair of clamping amplifier means to limit the voltage excursions derived from the photosensor output signal,
  b. resistance means for selecting any given voltage level within said excursions to vary the current output provided to said replicator means.

38. A photographic printer as claimed in claim 31 which further includes gross contrast control means, said means comprising:
  a. a plurality of diode pairs connected back-to-back in series, said diodes being arranged between said photosensor and said replicator, and being connected across the voltage excursion source defined by said clamping amplifiers,
  b. switch means for selecting any given number of said series-connected pairs of diodes to selectively limit the current levels supplied to said replicator.

39. A photographic printer using a cathode ray tube (CRT) light source for exposing an image receiving media, wherein the CRT beam intensity and dwell time are modulated to vary both the exposure level and the gross contrast of the photographic reproductions, said printer including:
  a. a CRT light source having an electron beam, a light-emitting phosphor screen, and a fast x-axis and slow y-axis deflection yoke surrounding said beam, wherein said electron beam generates a scanning spot of radiant energy on said screen,
  b. first and second support means to support said image carrying media and said image receiving media, respectively, said support means being separated by an optical means located between said image carrying media and said image receiving media, said optical means focussing the scanning spot from the light-emitting screen on the image receiving media after its passage through the image carrying media,
  c. photosensor means for measuring the intensity of the light passing through said image carrying media and generating an output signal in response thereto,
  d. replicator means for reproducing first and second output currents in response to the output signal received from said photosensor means,
  e. modulator means responsive to said first output current to vary the intensity of said electron beam as said first output current from said replicator means varies,
  f. deflection control means responsive to said second output current to vary the scanning beam dwell period, said deflection control means including means for charging and discharging a capacitor to vary the beam dwell time and beam advance by incrementally sampling and holding the control signal to said fast x-axis deflection yoke,
whereby both the CRT beam intensity and the spot dwell time are varied in response to variations in the light intensity received by said photosensor means.

40. A photographic printer as claimed in claim 39 wherein the charging rate of the capacitor in said deflection control means, and the value of the second output current supplied by said replicator, determine the duration of each incremental dwell period.

41. A photographic printer as claimed in claim 39 which further includes a fine exposure level control means, said fine level control means being located between said photosensor and said replicator, and including:
  a. a pair of clamping amplifier means to limit the voltage excursions derived from the photosensor current,
  b. resistance means for selecting any given voltage level within said excursions to vary the current output provided to said replicator means.

42. A photographic printer as claimed in claim 39 which further includes gross contrast control means, said means comprising:
  a. a plurality of diode pairs connected back-to-back in series, said diodes being arranged between said photosensor and said replicator, and being connected across the voltage excursion source defined by said clamping amplifiers,
  c. switch means for selecting any given number of said series-connected pairs of diodes to selectively limit the current levels supplied to said replicator.

* * * * *